Patented Apr. 19, 1932

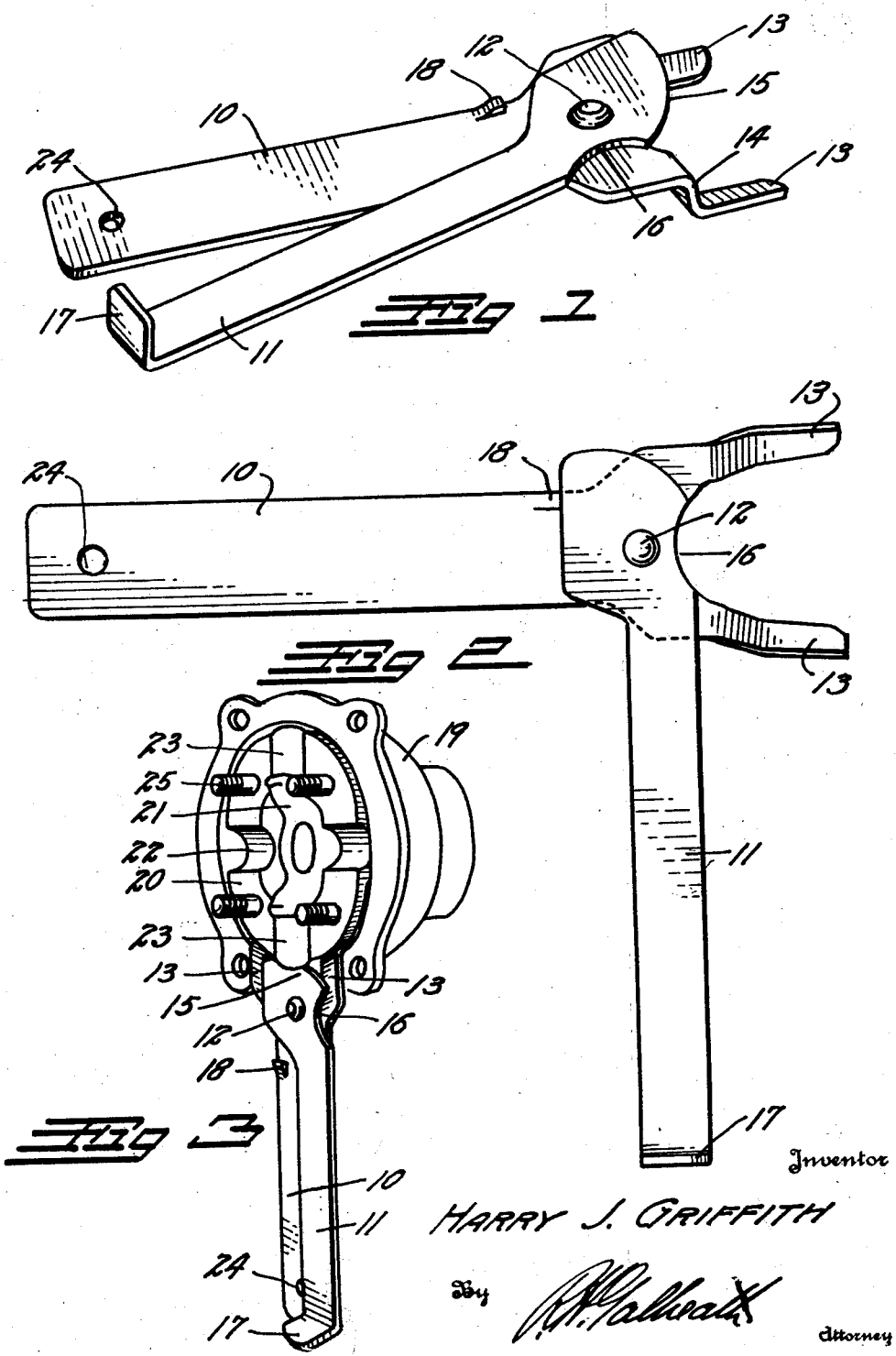

1,854,736

UNITED STATES PATENT OFFICE

HARRY J. GRIFFITH, OF DENVER, COLORADO

TOOL FOR USE IN ASSEMBLING UNIVERSAL JOINTS

Application filed July 16, 1929. Serial No. 378,638.

This invention relates to a tool to be used in assembling universal joints. On many of the present automobiles universal joints are employed in which one of the joint knuckles with one of the bearing caps is incased in one-half of the joint casing. The clearance between the edge of the bearing cap and the casing is exceedingly small so that it is impossible to insert the hand or fingers. This makes it exceedingly difficult and often impossible to hold the bearing cap in position while placing the other knuckle joint and remaining bearing cap in place. The principal object of this invention is to provide a tool which can be effectively used for holding the universal joint bearing cap in position while the remaining cap is being assembled.

Another object of this invention is to provide a tool of this nature which will be locked in position so that both hands may be used for assembling the remaining half of the universal joint.

Other objects and advantages reside in the detail construction of the invention, which is designed for simplicity, economy, and efficiency. These will become more apparent from the following description.

In the following detailed description of the invention reference is had to the accompanying drawings which forms a part hereof. Like numerals refer to like parts in all views of the drawings and throughout the description.

In the drawings:

Fig. 1 is a perspective view of the improved tool in the partially closed position.

Fig. 2 is a plan view of the tool in the open position.

Fig. 3 illustrates the tool in use upon a typical universal joint assembly.

The invention comprises a plier-like tool consisting of a first handle member 10 and a second handle member 11 secured together upon a pivot pin 12. One extremity of the first handle member 10 is bifurcated so as to form two forwardly projecting furcations 13. The furcations 13 are bent downwardly for a portion of their length, as shown at 14 and thence extend forwardly substantially parallel to the plane of the handle 10. The furcations 13 are relatively thin so that they can be inserted in the space between the bearing cap and the casing of a universal joint.

The second handle member 11 is formed with an eccentric cam surface 15 at its extremity, and with a notch 16 formed immediately behind the cam surface 15. The other extremity of the second handle member 11 is turned, as shown at 17, to facilitate opening the tool when the two handles are in alignment with each other.

The first handle member 10 is provided with a stop 18 which may be formed by indenting a portion of the metal thereof. The stop 18 serves to limit the amount of opening of the tool, as illustrated in Fig. 2. When in the fully opened position the notch 16 aligns with the notch between the furcations 13 of the first handle member 10.

One-half of a typical universal joint is illustrated in Fig. 3. In this view half of the joint casing is illustrated at 19; half of the joint bearing, herein designated as a bearing cap, at 20; and one of the joint knuckles at 21. The bearing cap 20 is provided with sockets 22 for receiving the journal extremities 23 of the joint knuckles and with studs 25 for securing the remaining bearing cap (not shown) in place over the assembled knuckles.

When the joint is disassembled the bearing cap 20 falls back into the case 19 and it is difficult to reach this half and bring it and hold it in position while placing the other knuckle and the other bearing cap thereon.

In using this invention the furcations 13 are inserted between the casing 19 and the edge of the bearing cap 20. The handle members are then forced toward the casing 19 to cause the furcations 13 to engage the back of the bearing cap 20 to bring it against the back side of the journals 23. When in this position the lower handle member 11 is closed causing the cam surface 15 to engage the extremity of a journal 23. This firmly locks the tool in the position illustrated in Fig. 3, so that it can be released and the mechanic can employ both of his hands to place the other knuckle and the remaining half of the bearing in position. The surfaces of the furcations 13 are slightly inclined toward the axis of the tool as shown in Figs. 1 and 2 to conform to the curvature of the back of the bearing cap 20.

It is now a simple matter to place the other joint knuckle in the sockets 22 and secure the other bearing cap in place upon the studs 25. When the bearing has been assembled and the retaining nuts tightened the handle members can be opened and the tool easily removed from position. When in the fully open position the notch 16 allows the tool to pass readily over the extremity of one of the journals 23, so that it can be readily swung to a position which will allow the furcations 13 to be disengaged.

It is the usual custom in assembling a universal to wedge the bearing cap 20 in place and with the back wheel of the automobile jacked up, turn the other bearing cap to align it therewith. When using this invention it is not necessary to jack up the wheels, since the half of the bearing cap on the gear box can be turned to the proper position and locked in place by means of the tool so that the remaining cap will fit thereover without rotating the shaft.

The turned extremity 17 forms a very handy tool for taking up the bushing screw in automobile drag links.

The handle member is useful as a separate unit and can be employed to carry out the above operation without the second handle member 11 but if used alone it must be held in place by the operator while the universal joint is being assembled.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A tool for assembling universal joints of the type having a casing and a joint knuckle bearing cap within said casing comprising: a first handle member; forked extremities formed on said handle member and arranged for insertion to a position between said cap and said casing; and a second handle member pivoted to swing parallel to said first handle member and arranged to lock said extremities in position, said second handle member being notched so that when in the open position said notch will align between said extremities and when in the closed position it will be swung laterally to one side.

2. An assembling tool comprising: a relatively flat first handle member; a bifurcated extremity on said handle member, each of the furcations of which extends in the plane of said handle member for a portion of its length, substantially at right angles to the plane of said handle member for another portion of its length, thence forwardly substantially parallel to the plane of said handle for the remaining portion of its length; a second handle member pivoted on said first handle member so as to swing in a plane parallel with the surface of said first handle member; and a projecting surface on said second handle member adapted to swing into said bifurcated extremity as said two handle members are brought into alignment so as to reduce the depth of the notch between said furcations.

3. An assembling tool comprising: a relatively flat first handle member; a bifurcated extremity on said handle member, each of the furcations of which extends in the plane of said handle member for a portion of its length, substantially at right angles to the plane of said handle member for another portion of its length, thence forwardly substantially parallel to the plane of said handle for the remaining portion of its length; a second handle member pivoted on said first handle member; and a cam surface on said second handle member adapted to gradually decrease the depth of the notch between said furcations as said handle members are brought into alignment.

4. An assembling tool comprising: a relatively flat first handle member; a bifurcated extremity on said handle member, each of the furcations of which extends in the plane of said handle member for a portion of its length, substantially at right angles to the plane of said handle member for another portion of its length, thence, forwardly substantially parallel to the plane of said handle for the remaining portion of its length; a second handle member pivoted on said first handle member; and a cam surface on said second handle member adapted to gradually decrease the depth of the notch between said furcations as said handle members are brought into alignment, said second handle member comprising: a relatively thin flat unitary member arranged to lie flat against the surface of said first handle member when in the closed position.

5. An assembling tool comprising: a relatively flat first handle member; a bifurcated extremity on said handle member, each of the furcations of which extends in the plane of said handle member for a portion of its length, substantially at right angles to the plane of said handle member for another portion of its length, thence, forwardly substantially parallel to the plane of said handle for the remaining portion of its length; a second handle member pivoted on said first handle member; a cam surface on said second handle member adapted to gradually decrease the depth of said bifurcation as said handle members are brought into alignment, said second handle member comprising: a relatively thin, flat unitary member arranged to lie flat against the surface of said first handle member when in the closed position; and a projection on one of said handle members adapted to engage and limit the movement of the other of said handle members.

6. A tool for assembling universal joints and the like comprising: a relatively flat first handle member; a bifurcated extremity on said handle member, each of the furcations of which extends in the plane of said handle member for a portion of its length, substantially at right angles to the plane of said handle member for another portion of its length, thence forwardly substantially parallel to the plane of said handle for the remaining portion of its length; and a locking member carried by said handle and adapted to be protruded forwardly from said handle between said furcations so as to extend the plane of said handle forwardly parallel to but in spaced relation from said furcations.

7. A tool for use in assembling universal joints of the type having a bearing cap for a journal within a casing comprising: a bifurcated handle member, the furcations of which are bent so as to extend into said casing and engage the rear of said bearing cap to hold the latter outwardly against said journal when said handle member is substantially parallel to the face of said casing; and a locking member adapted to be projected forwardly from said handle member to engage said journal and maintain said handle member in the above described parallel position.

In testimony whereof, I affix my signature.

HARRY J. GRIFFITH.